United States Patent Office 3,483,377
Patented Dec. 9, 1969

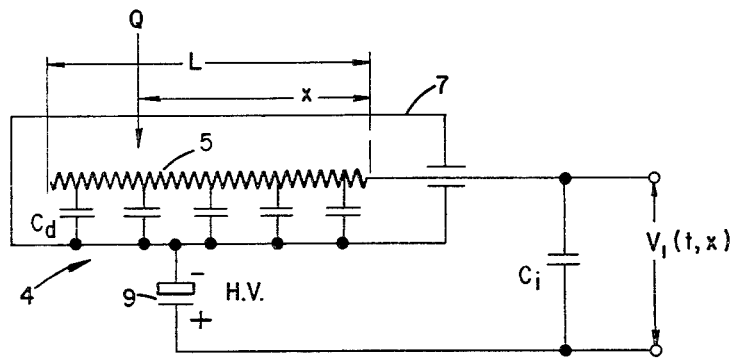
Fig. 1
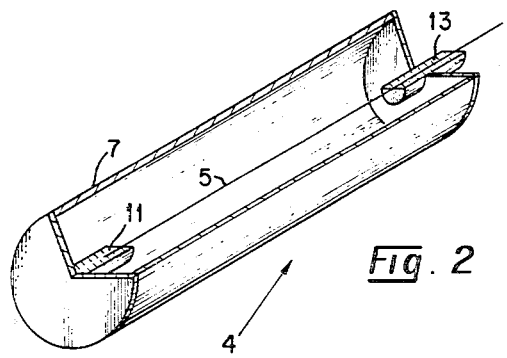
Fig. 2
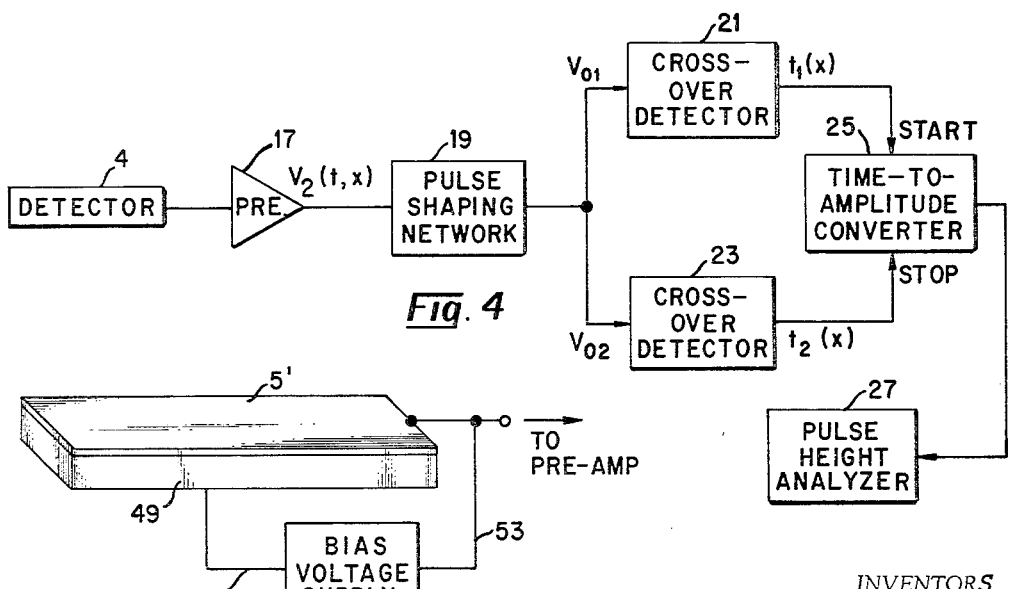
Fig. 4
Fig. 3
INVENTORS.
Casimer J. Borkowski
BY Manfred K. Kopp
ATTORNEY.

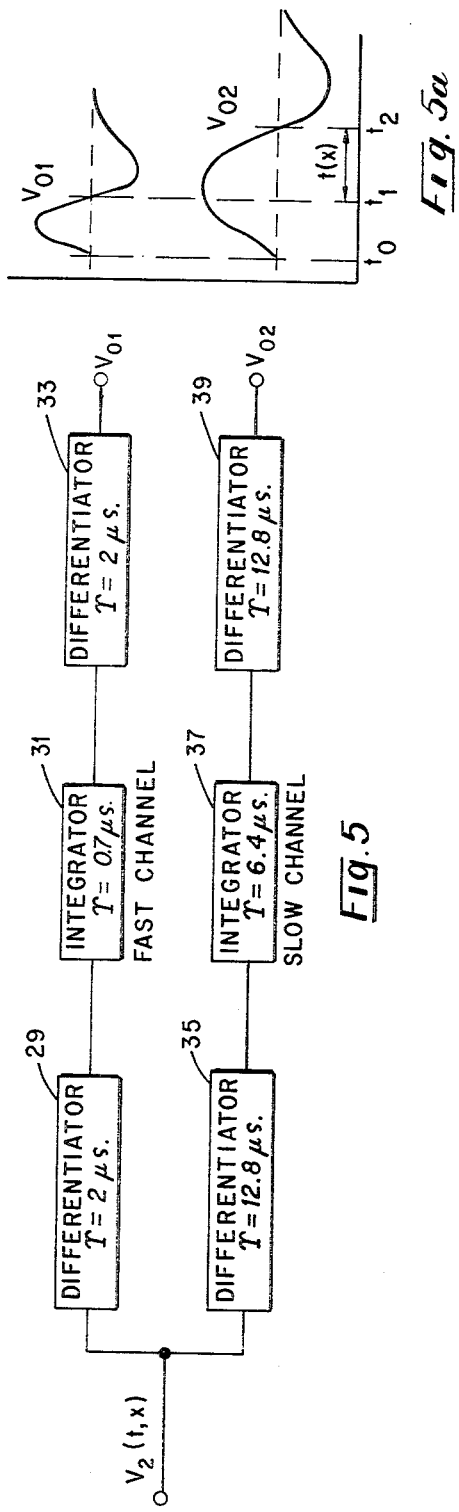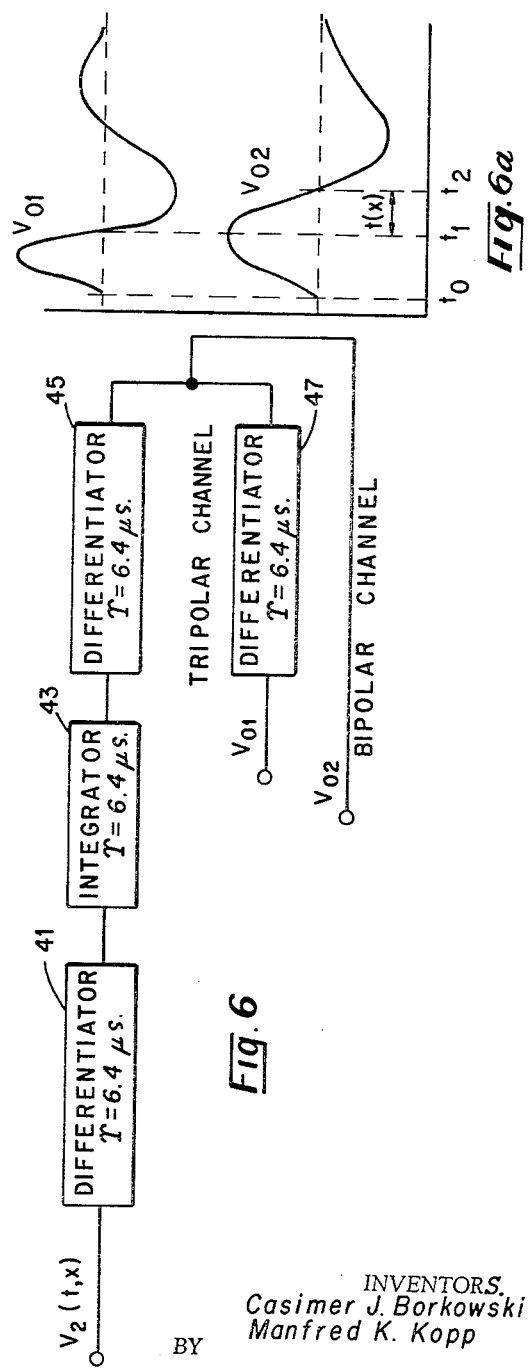

3,483,377
POSITION-SENSITIVE RADIATION DETECTOR
Casimer J. Borkowski and Manfred K. Kopp, Oak Ridge, Tenn., assignors to the United States of America as represented by the United States Atomic Energy Commission
Filed Nov. 3, 1967, Ser. No. 680,428
Int. Cl. G01t 1/16
U.S. Cl. 250—83.3                 9 Claims

ABSTRACT OF THE DISCLOSURE

A position-sensitive radiation detector is provided by inserting a very high resistance collector in an otherwise conventional detector. The rise time of any pulse therefrom is thereby position-sensitive, but energy independent. The rise time, and therefore the position, is accurately determined by pulse shaping and timing means.

Background of the invention

This invention was made in the course of, or under, a contract with the U.S. Atomic Energy Commission.

This invention relates to position-sensitive radiation detectors and more specifically to a position-sensitive detector which has improved spatial resolution through the use of a very high resistance collector in an otherwise conventional detector.

There are many applications in nuclear physics where it is desirable to know the spatial position of ionizing radiation. For example, in the field of nuclear diffraction (X-ray, neutron, etc.), the diffracted beams are found at various positions and each must be measured in some manner. This is conventionally accomplished using a film or, if a direct readout is desired, with a movable detector. In order to obtain statistically usable data, a given counting time must be used at each position, thus making this a slow method. If multiple detectors are used, there is the problem of relating the efficiencies of the various detectors. Similar problems of spatial measurement occur in magnetic spectrographs, spectrometers, in medical scanning, surface surveying, and the like.

These shortcomings have been well known and there has been research toward providing a position-sensitive detector. For example, a position-sensitive detector has been disclosed in "Nuclear Instruments and Methods" 40, 118–120, 1966, by W. R. Kuhlmann et al., in which the center collector wire resistance of a proportional counter was increased to approximately 40 ohms/cm. and voltage-sensitive preamplifiers were connected to both ends of the wire. An ionizing event along the wire gives rise to energy dependent localization pulses where amplitude is proportional to the energy of the entering particle and the position along the collector wire. These pulses are sensed by the preamplifiers and further compared to provide an energy independent ratio between the voltages sensed at each end of the collector wire. This energy independent ratio voltage is then utilized to determine the position of an ionizing event. In this proportional counter the sensitivity is limited by the necessary load resistors which connect each end of the collector wire to a high voltage supply. The linearity of this detector is limited also in that proportional counters longer than approximately 30 cm. lose their linearity due to transmission line effects.

Other position-sensitive detectors have been provided wherein the gas amplification factor is varied continuously along a proportional counter by continuously varying the diameter of the center wire as described in the "Journal of Scientific Instruments" 44 (1967), 203–206, by B. Greenberg. Since the radius of the center wire has a very great influence on the magnitude of the gas amplification factor, the pulse size is determined mainly by the position of the incoming quantum of radiation and its energy.

Summary of the invention

The present position-sensitive detector comprises an ionizing radiation detecting element having a very high resistance collector which is of sufficient resistance per unit length to provide a voltage pulse at an output end thereof whose rise time is proportional to the distance between the location of an ionizing event and the end of the collector. The output of this collector is connected to a voltage-sensitive preamplifier and the output of the preamplifier is connected to special multipolar pulse shaping circuitry which feeds corresponding crossover timing circuitry to accurately determine the rise time of the collector output pulse, thereby indicating the position of the event along the collector.

Accordingly, it is an object of this invention to provide a position-sensitive detector which is more sensitive to low energy ionizing particles.

Further, it is an object of this invention to provide a detector which produces output pulses whose rise times are indicative of the position of ionizing events within the detector.

Still another object of this invention is to provide a position-sensitive detector whose output is not affected by the length of the detector.

Yet another object of this invention is to provide a position-sensitive detector with improved spatial resolution.

Other objects and many of the attendant advantages of the present invention will become evident from the following description when taken in conjunction with the accompanying drawings.

Brief description of the drawings

FIG. 1 is a schematic diagram showing the equivalent circuit of a detector according to the present invention;

FIG. 2 is a pictorial view partially cut away of one embodiment of a position-sensitive detector of the gas-filled type according to the present invention;

FIG. 3 is a schematic diagram of an alternate embodiment of a position-sensitive detector of a semiconductor type;

FIG. 4 is a block diagram of the counter and associated pulse handling circuitry according to the present invention;

FIG. 5 is a block diagram of one embodiment of the pulse shaping network of FIG. 4 which is a fast-slow bipolar pulse shaping circuit;

FIG. 5a is a graphic illustration of the output pulse forms of the circuit according to FIG. 5;

FIG. 6 depicts a second embodiment of the pulse shaping network of FIG. 4 which is a bi-tripolar pulse shaping network; and FIG. 6a is a graphic illustration of the output pulse forms of the circuit according to FIG. 6.

Description of the preferred embodiments

The use of a highly resistive collector as a means of obtaining an output pulse that has a position-sensitive rise time is applicable to many detectors, including both gas and semiconductor types. The position-sensitive gas-filled detector, described hereinafter as an illustration of this invention, is more sensitive to low energy ionizing particles and has improved spatial resolution, as referred to the prior art detectors.

In a radiation detector, a charge is placed upon the collector whenever an ionizing event takes place within the sensitive region. In a gas-filled detector tube, this charge is placed upon the central collector wire or collecting electrode at a point closest to the position of the ionizing event. Ordinarily, this creates an output pulse that only indicates that there was an ionizing event, but does not specify the position. In the present invention, however, as shown in FIG. 1, the collector wire 5, shown schematically, has a very high resistivity, $\rho$. It is conventionally disposed within a conductive cylinder 7 which is electrically connected to the negative side of a high voltage supply 9. In this configuration, the wire resistance, the distributed wire-to-wall capacitance $C_d$, and the input capacitance $C_i$, of a preamplifier are effective in controlling the rise time of any output pulse. A charge Q, deposited instantaneously on any portion of a length L, of the wire 5 at a position X, causes a current $I_x$, to flow through wire 5 until equilibrium is reached where Q is distributed on the total capacitance $(L \cdot C_d + C_i)$.

The rise time of the voltage step $V(t, x)$ on $C_i$ is not a function of charge Q, but depends on the wire resistance $(\rho \cdot x)$ and capacitance $(C_d \cdot x)$ between position X and the preamplifier input. It has been determined that, if the collector 5 has a sufficiently high resistance in the range of 1.6K to 500K ohms/mm., a wide range of rise times is achieved so that high position sensitivity is achieved.

According to the present invention, as shown in FIG. 2, the detector consists of an aluminum cylinder 7 and a commercially available quartz fiber collector wire 5. Wire 5 is conventionally mounted centrally within cylinder 7 at each end thereof, for example, by means of insulators 11 and 13, respectively. Insulator 13 is disposed in an aperture 15 of one end of cylinder 7 so as to allow wire 5 to be extended therethrough for external connection. The quartz fiber collector wire is fused graphite coated and the resistivity thereof is approximately $20 \mp 2K$ ohms/mm., while the distributed wire-to-wall capacitance is approximately 0.0085 pf./mm. The cylinder size is typically 250 mm. long and 22 mm. in diameter.

Dependent upon the type of radiation to be detected, the cylinder 7 is filled with an appropriate ionizable gas. For example, when detecting X-rays, the cylinder is filled with a krypton-methane mixture. A $BF_3$- or $^3$He-filled unit is used when detecting neutrons. Other filling gases would make the counter suitable for survey work and the like.

The electronic circuitry for the measurement of a position-sensitive rise time of a detector output voltage step $V_1(t, x)$ is shown in FIG. 4. As shown, a conventional voltage-sensitive preamplifier 17 is connected to the output of detector 4. A pulse shaping network 19, which may take the form of several different embodiments, two of which will be described hereinafter, is connected to sense the output of preamplifier 17. Network 19 has two output pulses $V_{01}$ and $V_{02}$ which are multipolar and their crossover times are dependent upon the rise time of the voltage pulse from wire 5. The outputs of networks 19 are connected to crossover detectors 21 and 23, respectively. Crossover detectors 21 and 23 are of conventional circuit design and provide at their outputs pulses at time $t_1(x)$ and $t_2(x)$, respectively, which correspond to the crossover times of $V_{01}$ and $V_{02}$, respectively. The time difference $[t(x) = t_2(x) - t_1(x)]$ is converted to a proportional amplitude pulse $V(x) = KT(x)$ in a conventional time-to-amplitude converter 25 which has separate inputs connected to the outputs of detectors 21 and 23, respectively. The output $V(x)$ of converter 25 is fed to a conventional multi-channel pulse-height analyzer 27 in which it is registered.

As stated above, the pulse shaping network 19 is a circuit which provides multipolar time differing pulses at separate outputs whose time difference is proportional to the rise time of the voltage pulse from the collector wire 5. This network may take the form of a fast-slow bipolar system, as shown in FIG. 5, or a bi-tripolar system, as shown in FIG. 6. In either case, the output pulses $V_{01}$ and $V_{02}$ have different crossover times $(t_1, t_2)$ as shown in the graphs of FIGS. 5a and 6a. The crossover time difference $t(x)$ is proportional to the rise time of the output pulse from collector wire 5 and is thus indicative of the position of the ionizing event along the wire.

Referring to FIGS. 5 and 5a, the fast-slow system comprises two parallel channels of series connected passive filters with different time constants which produce bipolar voltages $V_{01}$ and $V_{02}$, respectively. As shown, the fast channel consists of a differentiator circuit 29 which is connected to receive the energy independent pulse from collector wire 5. The output of differentiator 29 is connected to an integrator circuit 31 which integrates the signal and passes it on to a second differentiator circuit 33. The differentiators have a time constant of $T=2$ $\mu$s. and the integrator has a time constant of $T=0.7$ $\mu$s. This results in bipolar pulse $V_{01}$ having its crossover at $t_1$ as shown in the graph of the outputs in FIG. 5. The slow channel, consisting of a differentiator circuit 35, integrator circuit 37, and differentiator circuit 39, is connected similarly to the fast channel, but has a longer time constant to provide a slower pulse having a crossover time $t_2 > t_1$. The differentiators in this slow channel have a time constant of $T=12.8$ $\mu$s. and the integrator time constant is $T=6.5$ $\mu$s. The crossover times of $V_{01}$ and $V_{02}$ are determined by the rise time of the pulse from wire 5 and thus the time difference $(t_2 - t_1)$ is proportional to the position of the ionizing event in the detector 4. Each of the differentiators and integrators is of conventional design with predetermined RC time constants (T) as specified in the example above. As described above, the time differing pulses $V_{01}$ and $V_{02}$ are fed to crossover detectors 21 and 23, respectively.

Referring now to FIGS. 6 and 6a, an alternate embodiment of the pulse shaping network is shown. It is designed as a bi-tripolar network because the output providing the voltage $V_{01}$ is a tripolar pulse, while the output providing the voltage $V_{02}$ is a bipolar pulse. As shown in FIG. 6, this embodiment consists of a first differentiator 41 connected to receive the voltage pulse $V_2$. The output of differentiator 41 is connected to the input of an integrator 43 whose output is connected to a second differentiator 45 which is further connected serially to a third differentiator 47. The predetermined RC time contants of each of the circuits of FIG. 6 are identical at $T=6.4$ $\mu$s., for example. The bipolar pulse $(V_{02})$ is obtained after the second differentiator 45. Again the crossover times, $t_1$ and $t_2$, depend upon the rise time of the pulse $V_2$ and thus the time difference is proportional to the position of the event in the detector. While this system has a simple electronic circuit of series-connected passive filters which is useful in some applications, the aforementioned fast-slow system has been found to be more sensitive and thus provides better spatial resolution. Using the above-described fast-slow system, the full width at half-maximum of a peak produced by a collimated $^{109}$Cd (20 kev.) X-ray beam at any positon along the counter, with the exclusion of approximately 30 mm. at each end of the collector wire, is 0.2% of the detector length (0.5 mm. for a 250-mm.-long counter). This is accomplished using a collimator having an 0.1-mm.-wide slit in a 50-mm.-thick lead block.

Although a preferred embodiment has been shown and described herein, obviously many modifications may be made, especially with regard to the pulse handling circuitry. For example, the time-to-amplitude converter 25 (FIG. 4) may be eliminated and the outputs of the crossover detectors 21 and 23, respectively, could be used to "start" and "stop" an oscillator, and the number of cycles generated during the on time of the oscillator could be stored directly as a digital signal in the pulse-height analyzer 27. This would eliminate the usual analog-to-digital converter and amplitude-to-time converter stage of the pulse-height analyzer and would make the present counter more suitable for packaging as a unit instrument. In this arrangement amplitude measurement of a pulse would be completely eliminated from the system.

As pointed out above, the use of highly resistive collector as a means of obtaining an output pulse that has a position-sensitive rise time is not limited to gas-filled detectors such as proportional counters or pulse-ion counters. Shown for example in FIG. 3 is a semiconductor detector made of an elongated surface-barrier diode having a semiconductor body 49 of an N-type material such as silicon and a high resistive collector 5' of a P-type material such as a thin metallic layer of palladium or gold vapor deposited on an etched surface of the semiconductor. A bias voltage supply 51 is connected across the metal-silicon barrier by means of leads 53 and 55 connected, respectively, to the metallic collector 5' and the opposite surface of the semiconductor body 49. The reference end of collector 5' is connected to the preamplifier as indicated in FIG. 3.

It is well known that surface-barrier diodes of the type described above can be used to detect radiation which impinges upon the semiconductor. The radiation particles passing into the sensitive region of the semiconductor material adjacent the metallic-silicon barrier produces hole-electron pairs in the semiconductive material and the applied electric field across the semiconductor causes these holes and electrons to drift in the electric field, thus giving rise to an external current in the collector due to redistribution of the charge as in the collector wire of the proportional detector. Thus, according to the present invention, if the collector 5' is of a predetermined high value of resistance, the rise time of an output pulse is proportional to the distance of the event from the collector 5' output end, thus providing position-sensitive detection as in the gas-filled detector described above.

Further, it has been found that other ion chambers with or without gas amplification can be provided with a high resistance collector to similarly provide position-sensitive detection.

Thus, it will be seen that a position-sensitive detector has been provided which is more sensitive to low energy ionizing particles, has improved spatial resolution, and good linearity for longer length detection by utilizing the rise time of a pulse generated by an ionizing event along the detector to provide time differing signals proportional to the rise time which is in turn indicative of the position of the event.

In view of the above and numerous other equally possible arrangements, the scope of the invention should be considered limited only by the following claims.

What is claimed is:

1. A position-sensitive detector comprising: an ionizing radiation detecting element having a high resistance collector, said collector being of sufficient resistance per unit length to provide a voltage pulse at an output end thereof whose rise time is proportional to the distance between the position of an ionizing event and said output end of said collector; a voltage sensitive amplifier having an input and an output for amplifying pulses from said collector connected to said input thereof; pulse shaping means having an input connected to said output of said amplifier for providing first and second multipolar time differing pulses at first and second outputs, respectively, whose time difference is proportional to the rise time of said voltage pulse from said collector; and means connected to the output of said pulse shaping means for detecting and recording said time difference of said time differing pulses thereby indicating the position of said ionizing event along said collector.

2. A position-sensitive detector as set forth in claim 1 wherein said detecting element is an ionizable gas-filled detector tube having a highly resistive quartz fiber collector.

3. A position-sensitive detector as set forth in claim 1 wherein said detecting element is a surface-barrier diode having an elongated semiconductor body of an N-type material and a thin collector of a high resistivity P-type material.

4. A position-sensitive detector as set forth in claim 1 wherein said collector resistance is in the range of 1.6K to 500K ohms/mm.

5. A position-sensitive detector as set forth in claim 1 wherein said pulse shaping means comprises a pair of parallel pulse shaping channels, each having an input and an output, said channels having their inputs connected in common to said output of said amplifier, and each of said channels having different passive filters so that bipolar pulses produced at said outputs, respectively, have a crossover time difference proportional to the rise time of said voltage pulse from said collector.

6. A position-sensitive detector as set forth in claim 5 wherein each of said parallel pulse shaping channels comprises a first RC differentiator having an input and an output, said input of said first differentiator being connected to the output of said voltage-sensitive amplifier, an RC integrator having an input and an output, said input of said integrator being connected to said output of said first differentiator, and a second RC differentiator having an input and an output, said input of said second differentiator being connected to said output of said integrator.

7. A position-sensitive detector as set forth in claim 1 wherein said pulse shaping means comprises a first RC differentiator having an input and an output, said input of said first differentiator being connected to the output of said voltage-sensitive amplifier, an RC integrator having an input and an output, said output of said first differentiator being connected to said input of said integrator, a second RC differentiator having an input and an output, said output of said integrator being connected to said input of said second differentiator, a third RC differentiator having an input and an output, said output of said second differentiator being connected to said input of said third differentiator, said output of said third differentiator being a tripolar pulse and providing said first output of said pulse shaping means, said output of said second differentiator being a bipolar pulse and providing said second output of said pulse shaping means, each of said differentiators and said integrator having the same predetermined RC timing constant, and said tripolar pulse and said bipolar pulse having a crossover time difference between first crossover of said tripolar pulse and crossover of said bipolar pulse which is proportional to the rise time of said voltage pulse from said collector.

8. A position-sensitive detector as set forth in claim 5 wherein said means connected to the output of said pulse shaping means for detecting and recording said time difference comprises a first crossover detector having an input and an output, said first output of said pulse shaping means being connected to said input of said first crossover detector, a second crossover detector having an input and an output, said second output of said pulse shaping means being connected to said input of said second crossover detector, and each of said crossover detectors providing an output pulse which corresponds to the crossover time of the pulse applied thereto.

9. A position-sensitive detector as set forth in claim 8 wherein said means connected to the output of said pulse shaping means for detecting and recording said time difference further comprises a time-to-amplitude converter having a first and a second input and an output, said output of said first crossover detector being connected to said first input of said converter, said output of said second crossover detector being connected to said second input of said converter wherein the time difference between said output pulses from said crossover detectors are converted to a proportional amplitude pulse, and a pulse-height analyzer connected to said output of said time-to-amplitude converter for registering said amplitude pulses.

References Cited

UNITED STATES PATENTS

| 2,551,576 | 5/1951 | Bailey | 250—83.6 |
| 3,207,902 | 9/1965 | Sandborg | 250—83.3 |

ARCHIE R. BORCHELT, Primary Examiner

U.S. Cl. X.R.

250—83.6; 313—93